United States Patent
Chai et al.

(10) Patent No.: US 11,284,395 B2
(45) Date of Patent: Mar. 22, 2022

(54) METHOD FOR TRANSMITTING SYSTEM INFORMATION AND APPARATUS

(71) Applicant: Huawei Technologies Co., Ltd., Shenzhen (CN)

(72) Inventors: Li Chai, Shenzhen (CN); Jian Zhang, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 250 days.

(21) Appl. No.: 16/267,964

(22) Filed: Feb. 5, 2019

(65) Prior Publication Data

US 2019/0174477 A1 Jun. 6, 2019

Related U.S. Application Data

(63) Continuation of application No. PCT/CN2017/097006, filed on Aug. 11, 2017.

(30) Foreign Application Priority Data

Aug. 11, 2016 (CN) .......................... 201610659442.6

(51) Int. Cl.
*H04W 72/04* (2009.01)
*H04W 16/28* (2009.01)

(52) U.S. Cl.
CPC ......... *H04W 72/046* (2013.01); *H04W 16/28* (2013.01); *H04W 72/04* (2013.01)

(58) Field of Classification Search
CPC ... H04W 72/046; H04W 72/04; H04W 16/28; H04W 72/042
See application file for complete search history.

(56) References Cited

U.S. PATENT DOCUMENTS

| 2013/0064239 | A1* | 3/2013 | Yu ....................... H04W 72/046 370/350 |
| 2014/0112220 | A1 | 4/2014 | Kwak et al. |

(Continued)

FOREIGN PATENT DOCUMENTS

| CN | 101064558 A | 10/2007 |
| CN | 101217689 A | 7/2008 |

(Continued)

OTHER PUBLICATIONS

"MIMO/beamforming for 5G new radio interface for over-6GHz: system architecture and design aspects," Agenda item: 8.1.7, Source: Samsung, Document for: Discussion and Decision, 3GPP TSG RAN WG1 #84bis, R1-162183, Busan, Korea, Apr. 11-15, 2016, 7 pages.

(Continued)

*Primary Examiner* — Otis L Thompson, Jr.
(74) *Attorney, Agent, or Firm* — Slater Matsil, LLP

(57) ABSTRACT

This application relates to the field of system information transmission technologies, and in particular, to a method for transmitting system information and an apparatus. A related method for receiving system information includes: determining, by a terminal device, resource information, where the terminal device uses one beam to perform communication on a resource indicated by the resource information; and receiving, by the terminal device based on the resource information, system information on the resource indicated by the resource information. According to the method for transmitting system information and the apparatus in this application, a probability of successfully receiving system information by a terminal device can be increased.

17 Claims, 4 Drawing Sheets

(56) References Cited

U.S. PATENT DOCUMENTS

| | | | | |
|---|---|---|---|---|
| 2014/0301353 | A1* | 10/2014 | Frenne | H04L 27/2692 370/330 |
| 2016/0192358 | A1 | 6/2016 | Lee et al. | |
| 2017/0201974 | A1* | 7/2017 | Sohn | H04W 74/008 |
| 2017/0325260 | A1* | 11/2017 | Guo | H04L 5/0092 |
| 2018/0138962 | A1* | 5/2018 | Islam | H04L 5/0032 |
| 2019/0081688 | A1* | 3/2019 | Deenoo | H04B 7/088 |
| 2019/0104549 | A1* | 4/2019 | Deng | H04W 72/0446 |
| 2019/0394705 | A1* | 12/2019 | Yang | H04W 72/0446 |
| 2020/0252976 | A1* | 8/2020 | Murray | H04L 5/0023 |
| 2020/0296765 | A1* | 9/2020 | Kim | H04W 74/0833 |

FOREIGN PATENT DOCUMENTS

| | | |
|---|---|---|
| CN | 101854233 A | 10/2010 |
| CN | 103906249 A | 7/2014 |
| CN | 104735685 A | 6/2015 |
| CN | 106856614 A | 6/2017 |
| KR | 20160064659 A | 6/2016 |
| WO | 2013070138 A1 | 5/2013 |
| WO | 2015090041 A1 | 6/2015 |

OTHER PUBLICATIONS

"3rd Generation Partnership Project; Technical Specification Group Radio Access Network Evolved Universal Terrestrial Radio Access (E-UTRA); Radio Resource Control (RRC); Protocol specification (Release 13)," 3GPP TS 36.331 V13.2.0, Jun. 2016, 623 pages.

Samsung, "System Information Signalling in NR", 3GPP TSG-RAN WG2 Meeting #93bis, R2-162215, Dubrovnik, Croatia, Apr. 11-15, 2016, 7 pages.

* cited by examiner

METHOD FOR TRANSMITTING SYSTEM INFORMATION AND APPARATUS

CROSS-REFERENCE TO RELATED APPLICATIONS

This application is a continuation of International Application No. PCT/CN2017/097006, filed on Aug. 11, 2017, which claims priority to Chinese Patent Application No. 201610659442.6, filed on Aug. 11, 2016, the disclosures of the aforementioned applications are hereby incorporated by reference in their entireties.

TECHNICAL FIELD

This application relates to the field of system information transmission technologies, and in particular, to a method for transmitting system information and an apparatus.

BACKGROUND

In a Long Term Evolution (LTE) system, system information broadcast is an important function of the system. The system information broadcast provides, for user equipment (UE), main information for accessing an access network system. For example, system information in the system information broadcast is a link between UE and an access network, and the UE and a network device that is in the access network implement services and physical processes in wireless communication through system information transmission.

In the LTE system, the system information includes a master information block (MIB) and a plurality of system information blocks (SIB), such as a SIB1, a SIB2 . . . , a SIB12, and a SIB13 . . . . In the current LTE system, a scheduling period of the MIB is 40 ms, and the MIB fixedly occupies a subframe 0 for sending, a scheduling period of the SIB1 is 80 ms, and the SIB1 fixedly occupies a subframe 5 for sending, and the SIB2, the SIB3 . . . the SIB12, and the SIB13 . . . are scheduled in a fixed transmit window by using an SI message. The UE receives the MIB and each SIB at fixed locations based on the scheduling period of the MIB and a scheduling period of each SIB.

In the current LTE system, cell coverage is full antenna coverage, and such coverage is continuous in terms of time. Therefore, sending of the system information is also deployed with no time gap. Therefore, the UE may receive the MIB and each SIB at the fixed scheduling locations of the MIB and each SIB. In an evolved LTE system and a 5G communications system, a massive multiple input multiple output (Massive MIMO)/beamforming technology is introduced, and the massive MIMO/beamforming technology uses an active antenna array technology. The technology combines a pilot signal design with a user channel high precision estimation algorithm to form a very accurate user-level ultra-narrow beam, so as to place energy in a user location. However, due to a limitation of antenna power, in this antenna technology-based deployment, beams in the cell coverage are not sent at all times, and there is a time gap. If the UE still receives the system information by using the existing method, it is very likely that the UE fails to obtain the system information at some time points.

SUMMARY

An invention objective of this application is to provide a method for transmitting system information and an apparatus, to improve a probability of successfully receiving system information by a terminal device.

According to a first aspect, a method for receiving system information is provided, including: determining, by a terminal device, resource information, where the terminal device uses one beam to perform communication on a resource indicated by the resource information, and receiving, by the terminal device based on the resource information, system information on the resource indicated by the resource information. In this implementation, the terminal device determines the resource information, and the terminal device may determine, based on the resource information, that occurrence of the system information is unknown, and further, the terminal device may receive the system information on the resource indicated by the resource information, thereby avoiding a case in which the terminal device performs an operation of receiving the system information at a fixed time point but the operation fails because there is no beam coverage at the corresponding time point, and increasing a probability of successfully receiving the system information by the terminal device.

A beam in this application is formed by using a beamforming technology of a multiple-antenna technology. The beam provides a plurality of physical channels such as a common control channel, a dedicated control channel, and a service channel for UE in the coverage. One cell includes a plurality of beams. A beam width of the beam is relatively narrow, and is usually less than 120 degrees. In a possible design, the resource information includes one or more of the following, including frequency domain information, time domain information, code domain information, and space domain information.

In a possible design, the frequency domain information includes one or more of the following: frequency information, carrier information, radio resource block information, and subcarrier information.

In a possible design, the time domain information is absolute time information, or the time domain information includes a period and an offset, or the time domain information includes a period, an offset, and duration.

In a possible design, the time domain information is at a granularity of a radio frame, a subframe, a time symbol, and/or a transmission time interval (TTI).

In a possible design, the determining, by a terminal device, resource information includes obtaining, by the terminal device, beam determining information, and determining, by the terminal device, the resource information based on the beam determining information. In this implementation, the terminal device may obtain the resource information based on the beam determining information.

In a possible design, the obtaining, by the terminal device, beam determining information includes obtaining, by the terminal device, the beam determining information from a network device. In this implementation, the terminal device obtains the beam determining information based on scheduling of the network device.

In a possible design, the beam determining information includes one or more of the following information about a total quantity of beams of a base station, information about parallel beams that occur simultaneously, and a signal used to identify a beam.

In a possible design, the signal used to identify a beam includes one or more of the following a beam reference signal, a beam discovery signal, and a beam identifier.

In a possible design, the determining, by the terminal device, the resource information based on the beam determining information includes when the beam determining information obtained by the terminal device includes the signal used to identify a beam, determining, by the terminal device, the resource information based on a correspondence between the signal used to identify a beam and the resource information.

In this implementation, the terminal device determines the resource information based on the correspondence between the signal used to identify a beam and the resource information, and therefore this implementation is simple.

In a possible design, the determining, by a terminal device, resource information includes determining, by the terminal device, the resource information through beam sweeping. In this implementation, the terminal device determines the resource information through beam sweeping, to reduce costs of interaction with the network device such as a base station.

In a possible design, the determining, by a terminal device, resource information includes determining, by the terminal device, the resource information based on beam information carried in a beam synchronization sequence, or determining, by the terminal device, the resource information by traversing masks, where the mask is a mask of a signal used to identify a beam or a mask corresponding to a resource used by a beam.

In a possible design, the resource information includes beam sending resource information and/or sending resource information of system information.

In a possible design, the sending resource information of system information includes sending resource information of at least one first system information block and sending resource information of at least one second system information block. In this implementation, the system information obtained by the terminal device may be the sending resource information of the at least one first system information block and the sending resource information of the at least one second system information block. This implementation is not only applied to a current communications system, but also is applied to future-developed 5G and evolved LTE systems.

In a possible design, the receiving, by the terminal device based on the resource information, system information on the resource indicated by the resource information includes receiving, by the terminal device, the system information on an intersection resource of a resource indicated by the sending resource information of system information and a resource indicated by the beam sending resource information, or receiving, by the terminal device based on the beam sending resource information, the system information on a resource indicated by the beam sending resource information.

In a possible design, the receiving, by the terminal device based on the beam sending resource information, the system information on a resource indicated by the beam sending resource information includes receiving, by the terminal device based on the beam sending resource information and according to a predefined rule or a manner notified by a network device, the system information on a subset or a full set of resources indicated by the beam sending resource information.

In a possible design, the receiving, by the terminal device based on the beam sending resource information and according to a predefined rule or a manner notified by a network device, the system information on a subset or a full set of resources indicated by the beam sending resource information includes selecting, by the terminal device in a specific sending period of system information, a first available resource on a time domain resource of the beam to receive the first system information block and/or the second system information block, or selecting, by the terminal device in a specific sending period of system information, an available resource closest to a predefined sending resource of system information on a time domain resource of the beam to receive the first system information block and/or the second system information block, or receiving, by the terminal device, the first system information block and/or the second system information block based on a period and an offset that are notified by the network device, or receiving, by the terminal device, the first system information block and/or the second system information block in a period that is a minimum common multiple of a sending period of system information and a beam sending period.

In a possible design, the receiving, by the terminal device based on the beam sending resource information and according to a predefined rule or a manner notified by a network device, the system information on a subset or a full set of resources indicated by the beam sending resource information includes when sending periods and sending subframes/a sending period and a sending subframe of the first system information block and/or the second system information block are fixed, selecting, by the terminal device, a beam that has an available resource at a corresponding time point, and reading the first system information block and/or the second system information block on the beam, or when sending periods and sending subframes/a sending period and a sending subframe of the first system information block and/or the second system information block are configured based on a beam sending period and a beam sending subframe, selecting, by the terminal device, a beam, and reading the first system information block and/or the second system information block at a corresponding time point of the selected beam.

In a possible design, the method further includes determining, by the terminal device, sending resource information of a third system information block based on the resource information.

In a possible design, the determining, by the terminal device, sending resource information of a third system information block based on the resource information includes determining, by the terminal device, a sending time of the third system information block by obtaining an intersection between a transmit window time of the third system information block and a beam sweeping time indicated by time domain information of a beam.

In a possible design, the determining, by the terminal device, sending resource information of a third system information block based on the resource information includes determining, by the terminal device, an intermediate value x according to a formula $x=(n-1)*\text{Window Length}$, where n is n in SI-n, SI is corresponding to the second system information block, n is a sequence number of the second system information block, n is greater than or equal to 1, and Window Length is an integer multiple of a beam sending period, determining, by the terminal device, a subframe location of SI-n according to a formula $a=(x+u) \bmod 10$, where a value of $x+u$ is within a range of $((n-1)*\text{Window Length}, n*\text{Window Length})$, and determining, by the terminal device, a radio frame location of SI-n according to a formula $\text{SFN} \bmod T1=\text{Floor}((x+u)/10)$, where T1 is a period of SI-n.

In a possible design, when the terminal device simultaneously receives a plurality of beams, the receiving, by the terminal device based on the resource information, system information on the resource indicated by the resource information includes reading, by the terminal device, system information of a beam N in an $N^{th}$ beam period based on resource information used by the beam N, where N is a sequence number of the plurality of beams simultaneously received by the terminal device, or reading, by the terminal device, system information of a beam N in each beam period based on resource information used by the beam N, where N is a sequence number of the plurality of beams simultaneously received by the terminal device.

In a possible design, the method further includes determining, by the terminal device, a receiving time for receiving a system information update indication message, receiving, by the terminal device, the system information update indication message at the determined receiving time, and obtaining, by the terminal device, all or a part of the resource information again based on the system information update indication message.

In a possible design, the determining, by the terminal device, a receiving time for receiving a system information update indication message includes aligning the receiving time that is used for receiving the system information update indication message and that is determined by the terminal device with a beam sending time.

In a possible design, a manner of the aligning the receiving time that is used for receiving the system information update indication message and that is determined by the terminal device with a beam sending time includes after the terminal device determines a sending time location of the system information update indication message, reading, by the terminal device, the system information update indication message on a beam that has an available resource at a corresponding time location, or when a sending time of the system information update indication message is configured based on a beam sending period and a beam sending subframe, reading, by the terminal device, the system information update indication message at a corresponding time location of a selected beam, or after the terminal device determines a sending time location of the system information update indication message, reading, by the terminal device, the system information update indication message on an intersection resource of an update indication message sending time and the beam sending time, or a period for receiving the system information update indication message by the terminal device is a minimum common multiple of a sending period of the system information update indication message and a beam sending period, and a subframe location for receiving the system information update indication message by the terminal device is configured based on a beam sending subframe location.

According to another aspect, a method for sending system information is provided, including allocating, by a network device, a resource to a beam, and providing, for a terminal device by the network device, resource information of the resource allocated to the beam.

In a possible design, the resource information includes one or more of frequency domain information, time domain information, code domain information, and space domain information.

In a possible design, the frequency domain information includes one or more of frequency information, carrier information, radio resource block information, and subcarrier information.

In a possible design, the time domain information is absolute time information, or the time domain information includes a period and an offset.

In a possible design, the time domain information is at a granularity of a radio frame, a subframe, a time symbol, and/or a TTI.

In a possible design, the network device provides beam determining information for the terminal device, so that the terminal device determines the resource information based on the beam determining information, where the beam determining information includes one or more of information about a total quantity of beams of a base station, information about parallel beams that occur simultaneously, and a signal used to identify a beam.

In a possible design, the signal used to identify a beam includes one or more of a beam reference signal, a beam discovery signal, and a beam identifier.

In a possible design, the providing, for a terminal device by the network device, resource information of the resource allocated to the beam includes adding, by the network device, beam information to a synchronization sequence, so that the terminal device determines the resource information based on the beam information in the synchronization sequence, or providing, by the network device, a mask of a beam discovery signal or signaling for the terminal device, so that the terminal device determines the resource information by traversing masks.

In a possible design, the resource information includes beam sending resource information and/or sending resource information of system information.

In a possible design, the sending resource information of system information includes sending resource information of at least one first system information block and sending resource information of at least one second system information block.

In a possible design, the method further includes notifying, by the network device, the terminal device of a receiving manner of system information, so that the terminal device receives, based on the notification of the network device, the system information on a subset or a full set of resources indicated by the beam sending resource information.

In a possible design, the notifying, by the network device, the terminal device of a receiving manner of system information includes selecting, in a specific sending period of system information, a first available resource on a time domain resource of the beam to receive the first system information block and/or the second system information block, or selecting, in a specific sending period of system information, an available resource closest to a predefined sending resource of system information on a time domain resource of the beam to receive the first system information block and/or the second system information block, or receiving the first system information block and/or the second system information block based on a period and an offset that are notified by the network device, or a receiving period of system information is a minimum common multiple of a sending period of system information and a period of a resource used by a beam.

In a possible design, the notifying, by the network device, the terminal device of a receiving manner of system information includes, when sending periods and sending subframes/a sending period and a sending subframe of the first system information block and/or the second system information block are fixed, selecting a beam that has an available resource at a corresponding time point, and reading the first system information block and/or the second system information block on the beam, or when sending periods and sending subframes/a sending period and a sending subframe of the first system information block and/or the second system information block are configured based on a beam sending period and a beam sending subframe, selecting a beam, and reading the first system information block and/or the second system information block at a corresponding time point of the selected beam.

In a possible design, the notifying, by the network device, the terminal device of a receiving manner of system information includes, when the terminal device simultaneously receives a plurality of beams, reading system information of a beam N in an $N^{th}$ beam period based on resource information used by the beam N, where N is a sequence number of the plurality of beams simultaneously received by the terminal device, or when the terminal device simultaneously receives a plurality of beams, reading system information of a beam N in each beam period based on resource information used by the beam N, where N is a sequence number of the plurality of beams simultaneously received by the terminal device.

In a possible design, the method further includes sending a system information update indication message to the terminal device.

According to still another aspect, an embodiment of this application provides a terminal device, and the terminal device has a function of implementing behaviors of the terminal device in the foregoing method design. The function may be implemented by using hardware, or may be implemented by hardware by executing corresponding software. The hardware or the software includes one or more modules corresponding to the foregoing function. The module may be software and/or hardware.

In a possible design, a structure of the terminal device includes at least one processor and a receiver. The at least one processor is configured to determine resource information, so that the terminal device uses one beam to perform communication on a resource indicated by the resource information. The receiver is configured to receive, based on the resource information, system information on the resource indicated by the resource information.

According to another aspect, an embodiment of this application provides a network device, and the network device has a function of implementing actual behaviors of the network device in the foregoing method. The function may be implemented by using hardware, or may be implemented by hardware by executing corresponding software. The hardware or the software includes one or more modules corresponding to the foregoing function.

In a possible design, a structure of the network device includes at least one processor and a transmitter. The at least one processor is configured to allocate a resource to a beam, and the transmitter is configured to provide, for a terminal device, resource information of the resource allocated to the beam.

According to still another aspect, an embodiment of this application provides a computer storage medium, the computer storage medium is configured to store a computer software instruction used by the foregoing terminal device, and the computer software instruction includes a program designed to perform the foregoing aspect.

According to still another aspect, an embodiment of this application provides a computer storage medium, the computer storage medium is configured to store a computer software instruction used by the foregoing network device, and the computer software instruction includes a program designed to perform the foregoing aspect.

According to the solutions in the embodiments of this application, a case in which the terminal device performs an operation of receiving the system information at a fixed time point but the operation fails because there is no beam coverage at the corresponding time point can be avoided to some extent, and a probability of successfully receiving the system information by the terminal device can be increased.

BRIEF DESCRIPTION OF THE DRAWINGS

To describe the technical solutions in the embodiments of this application more clearly, the following briefly describes the accompanying drawings required for describing the embodiments.

DETAILED DESCRIPTION OF ILLUSTRATIVE EMBODIMENTS

Network architectures and service scenarios that are described in the embodiments of this application are used to describe the technical solutions in the embodiments of this application more clearly, but are not intended to limit the technical solutions provided in the embodiments of this application. A person of ordinary skill in the art may learn that, with evolution of the network architectures and emergence of a new service scenario, the technical solutions provided in the embodiments of this application are also applicable to a similar technical problem.

Figure 1:
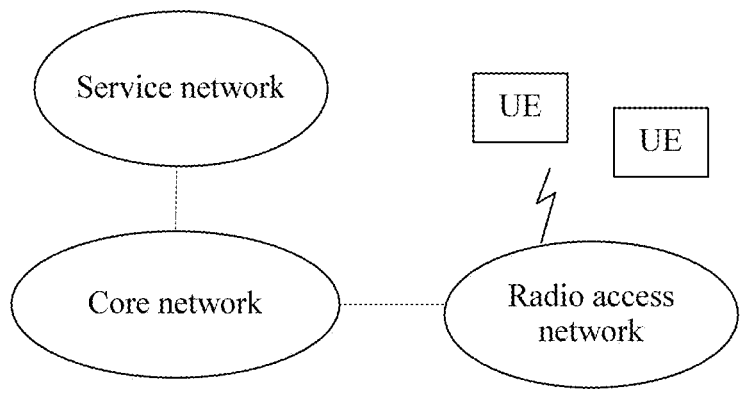
FIG. 1 is a schematic diagram of a possible application scenario of this application.

FIG. 1 is a schematic diagram of a possible application scenario of this application. In this application, a terminal device is UE in FIG. 1, and the UE accesses a service network by using a radio access network (RAN) and a core network (CN). The technologies described in this application can be applied to an LTE system, an evolved LTE system, and a 5th Generation 5G communications system that use an active antenna array technology, or various other wireless communications systems that use an active antenna array technology.

In this application, terms "network" and "system" are usually interchangeably used, but a meaning of the terms may be understood by a person skilled in the art. User equipment UE in this application may include various handheld devices, in-vehicle devices, wearable devices, or computing devices with a wireless communication function, or other processing devices connected to a wireless modem, and various forms of user equipments (UE), mobile stations (MS), terminals, terminal equipments, and the like. For ease of description, in this application, the devices mentioned above are referred to as user equipment or UE. A network device in this application may be a device in a radio access network depending on a requirement, such as a base station, or a device in a core network, such as a mobility management entity (MME). The foregoing base station (BS) is an apparatus that is deployed in the radio access network and configured to provide a wireless communication function for UE. The base station may include various forms of macro base stations, micro base stations, relay stations, access points, and the like. In systems in which different radio access technologies are used, devices with a base station function may be named differently.

Figure 2:
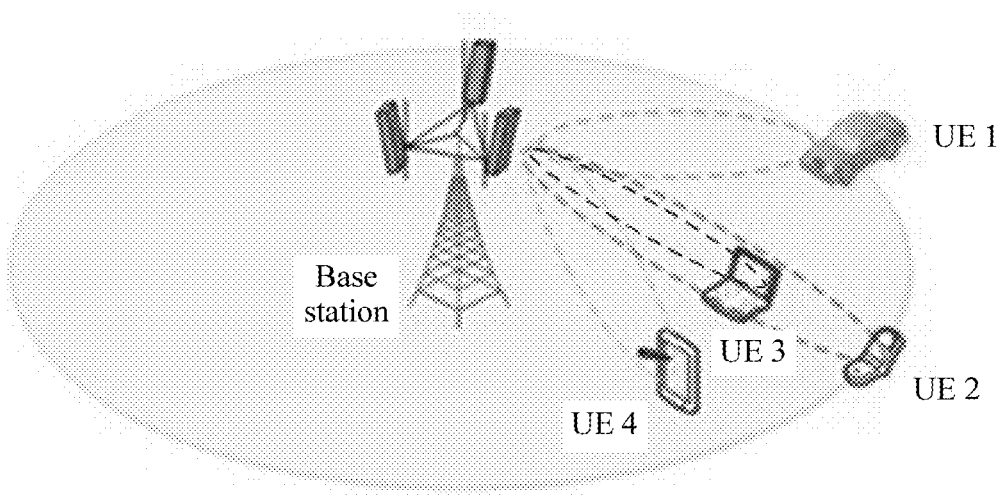
FIG. 2 is a schematic diagram of a specific scenario according to an embodiment of this application.

FIG. 2 is a schematic diagram of a specific scenario according to an embodiment of this application. A system shown in FIG. 2 supports a beamforming technology, for example, a 3D-MIMO technology. As shown in FIG. 2, an antenna on a base station forms a plurality of beams, and each beam corresponds to a different virtual zone. In FIG. 2, UE 1, UE 2, UE 3, and UE 4 respectively correspond to a beam 1, a beam 2, a beam 3, and a beam 4. The beam 1, the beam 2, and the beam 4 are spatially multiplexed in a horizontal dimension, and the beam 2 and the beam 3 are spatially multiplexed in a vertical dimension. Limited by antenna power, the beams are successively transmitted in time domain, and this is referred to as a beam sweeping technology. In beam sweeping, for virtual zones (the virtual zone herein may correspond to a cell or a sector) in which the UE 1, the UE 2, the UE 3, and the UE 4 are located, a beam within a coverage area of each virtual zone is not sent at all times, and there is a specific time interval between two adjacent beams in any virtual zone.

In an example, cell coverage is full antenna coverage, such coverage is continuous in terms of time, and system information in current system information broadcast is also deployed based on such a full antenna coverage manner. Because there is a specific time interval between coverage beams in the system shown in FIG. 2, if the system information deployment manner in the existing solution is still used, the UE may fail to obtain the system information at some time points. To improve a success rate of obtaining the system information by the UE, an embodiment of this application provides a method for transmitting system information, based on the system shown in FIG. 2. The method for transmitting system information in this application includes a method for receiving system information and a method for sending system information. The following describes the receiving method and the sending method in detail with reference to the accompanying drawings.

The beam in this embodiment of this application is formed by using the beamforming technology of the multiple-antenna technology. The beam provides a plurality of physical channels such as a common control channel, a dedicated control channel, and a service channel for the UE in the coverage. One cell includes a plurality of beams. A beam width of the beam is relatively narrow, and is usually less than 120 degrees.

A cell may be a cell in a coverage area, or may be a large cell that has a plurality of transmission points, for example, a hypercell or a super cell, or may be a resource set that logically has a uniform identifier. Different beams in a same cell may be from a same transmission point or different transmission points.

In this application, to expand high-frequency cell coverage, a method for sending a plurality of narrow beams a plurality of times in time domain to cover different service areas is used in a network. On one OFDM symbol, an analog beam in a subcolumn is sent in a direction. Therefore, a quantity of subcolumns determines a quantity of directions of beams on one OFDM symbol and corresponding coverage. However, a quantity of beams that covers an entire service area is significantly greater than the quantity of subcolumns, especially when a width of each beam is very narrow. Sending of different narrow beams in time domain is also referred to as a beam sweeping technology. This technology is used to cover the entire service area by using the beams, to obtain a relatively large directional antenna gain.

In the system information transmission solution in this embodiment of this application, especially in the method for receiving system information, because the beam is not covered at all times, the UE does not directly receive the system information according to the method in an example. In the solution in this application, the UE determines resource information, and the UE may receive, based on the resource information, the system information on a resource indicated by the resource information, thereby avoiding a case in which the UE performs an operation of receiving the system information at a fixed time point but the operation fails because there is no beam coverage at the corresponding time point.

Figure 3:
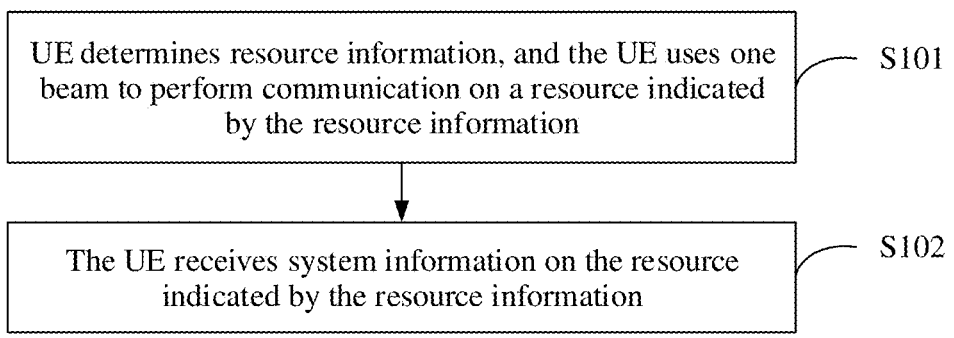
FIG. 3 is a flowchart of a method for receiving system information according to an embodiment of this application.

FIG. 3 is a flowchart of a method for receiving system information according to an embodiment of this application. As shown in FIG. 3, processing steps of the method includes the following steps.

S101: UE determines resource information, and the UE uses one beam to perform communication on a resource indicated by the resource information.

That UE determines resource information is specifically that the UE determines resource information in a cell in which the UE is located. The resource information may have a plurality of representation manners, such as one or more of frequency domain information, time domain information, code domain information, and space domain information that are of a resource used by a beam.

Optionally, the frequency domain information includes one or more of frequency information, carrier information, radio resource block information, and subcarrier information.

Optionally, depending on a requirement, the time domain information may be absolute time information of beam occurrence, or may be relative time information of beam occurrence. The relative time information may be a period and an offset of beam occurrence, or may be a period, an offset, and duration of beam occurrence.

Further, the time domain information of the beam is at a granularity of a radio frame, a subframe, a time symbol, and/or a TTI.

The code domain information is coding information of the resource used by the beam.

The space domain information is spatial information of the resource used by the beam, such as a beam identifier and a beam reference signal.

From another division angle, the resource information includes beam sending resource information and sending resource information of system information, and that UE determines resource information may be that the UE determines the beam sending resource information and/or the sending resource information of system information.

S102: The UE receives system information on the resource indicated by the resource information.

The UE determines, based on the resource information obtained in the foregoing S101, the resource for broadcasting the system information on the beam, and further receives the system information on the resource used to transmit the system information.

In the foregoing S101, the sending resource information of system information includes sending resource information of at least one first system information block and sending resource information of at least one second system information block. The UE receives the at least one first system information block on a corresponding resource based on the sending resource information of the at least one first system information block, and receives the at least one second system information block on a corresponding resource based on the sending resource information of the at least one second system information block. The UE further receives a third system information block, where a resource location for transmitting the third system information block is obtained through calculation, and a specific calculation method is described in detail in the following embodiment.

In an LTE system, the first system information block is corresponding to a master information block MIB, the second system information block is corresponding to a first system information block SIB1, and the third system information block is corresponding to one or more SIs (SI1-SIn). In an evolved LTE system, a 5G communications system, and another communications system, another naming manner may be used for the first system information block, the second system information block, and the third system information block.

In the foregoing S101, a manner in which the UE determines the resource information includes but is not limited to the following manners.

Manner 1: (1) The UE obtains beam determining information.

Optionally, the UE obtains the beam determining information from a network device. The network device may be a base station communicating with the UE or another base station or a core network or a server. For example, the UE obtains the beam determining information in a radio resource control (RRC) release message after an attach process is completed. For another example, the UE obtains the beam determining information during an attach process. For another example, the UE obtains the beam determining information from a handover message during a handover process.

The beam determining information obtained by the UE from the network device includes one or more of information about a total quantity of beams of a base station, information about parallel beams that occur simultaneously, a signal used to identify a beam, and a signal used to distinguish a beam resource (that is, the beam itself is invisible to the UE).

Optionally, the signal used to identify a beam includes one or more of a beam reference signal, a beam discovery signal, and a beam identifier. The beam discovery signal includes a beam reference signal in an implementation.

Optionally, the signal used to distinguish a beam resource is a signal for the UE to distinguish a beam resource within a specific range, for example, within a base station, within a specific geographical range, or within a TRR, and the beam is invisible to the UE.

It should be noted that timing for obtaining the beam determining information by the UE may be that the UE obtains the beam determining information through interaction with the network device when the UE needs to obtain beam resource information, or the UE obtains beam determining information from the network device in advance, and searches the beam determining information obtained in advance for required information when the UE needs to obtain beam resource information.

(2) The UE determines the resource information based on the beam determining information.

When the beam determining information obtained by the UE includes the signal used to identify a beam and/or the signal used to distinguish a beam resource, the UE determines the resource information based on correspondences/a correspondence between the resource information and the signal used to identify a beam and/or the signal used to distinguish a beam resource.

The following provides a specific example of determining the resource information based on the correspondence between the signal used to identify a beam and the resource information. The correspondence may be predefined in standard protocol text, stored in a UE memory, or configured by using network signaling.

Figure 4:
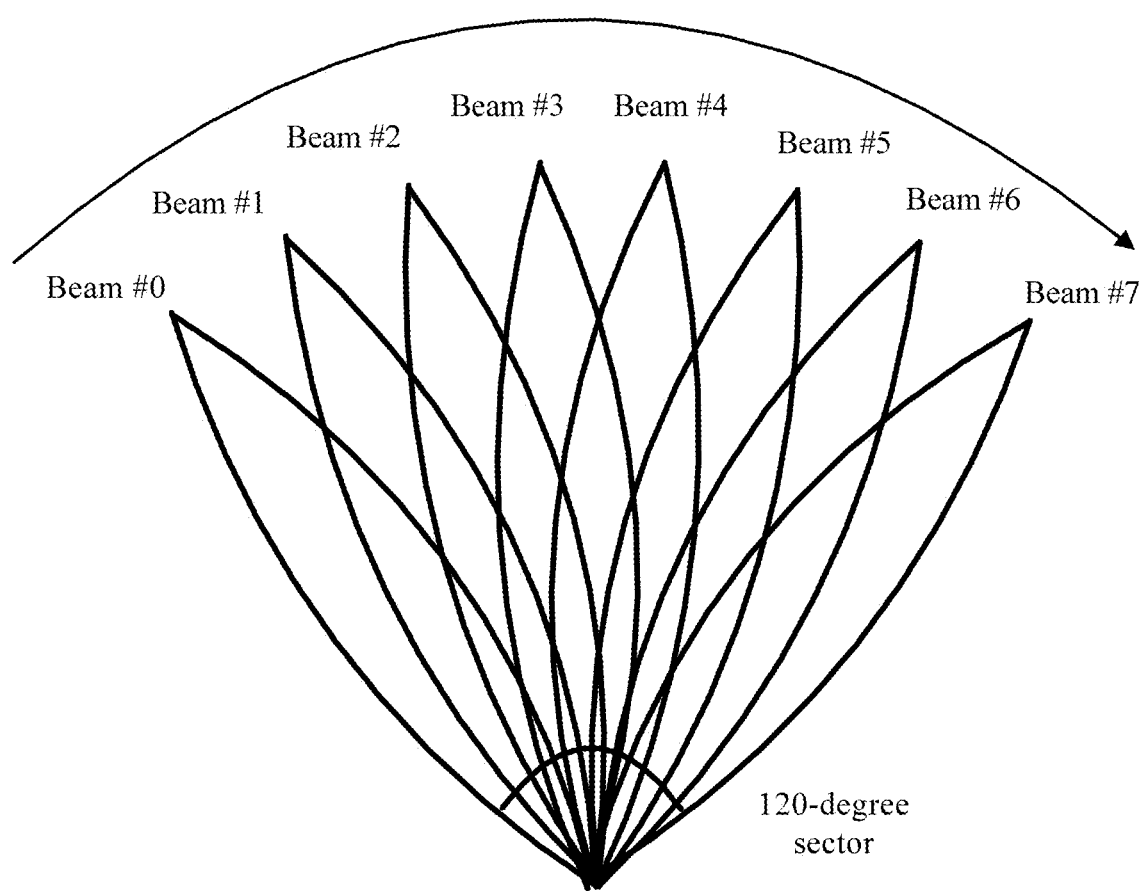
FIG. 4 is a schematic diagram of a beam.

Referring to FIG. 4, FIG. 4 is a schematic diagram of a beam. As shown in FIG. 4, assuming that physical broadcast channels (PBCH) in a cell or a sector are distributed and sent in eight beams, sequence numbers of the eight beams are 0-7. The sequence number is used as an identification number of the beam, and has a correspondence with a signal used to identify a beam and/or a signal used to distinguish a beam resource of the beam. As shown in Table 1 and Table 2, beams of different sequence numbers are corresponding to different working time. T1, T2 . . . in the table may be absolute time information of beam occurrence, or may be a period and an offset of beam occurrence. Time information may be at a granularity of a radio frame, a subframe, a time symbol, and/or a TTI.

TABLE 1

Beam-Working time comparison table

| Beam sequence number | Working time |
|---|---|
| 0 | T1 |
| 1 | T2 |
| 2 | T3 |
| 3 | T3 |
| 4 | T4 |
| 5 | T5 |
| 6 | T6 |
| 7 | T7 |

TABLE 2

Beam-Working time comparison table

| Beam sequence number | Working time |
|---|---|
| 0 | T1 |
| 1 | T2 |
| 2 | T3 |
| 3 | T4 |
| 4 | T1 |
| 5 | T2 |
| 6 | T3 |
| 7 | T4 |

For another example, in Table 3, a comparison relationship between a beam serial number, working time, and a working frequency domain is provided.

TABLE 3

Beam-Working time-Working frequency domain comparison table

| Beam sequence number | Working time | Working frequency domain |
|---|---|---|
| 0 | T1 | F1 |
| 1 | T2 | F2 |
| 2 | T3 | F3 |
| 3 | T4 | F4 |

TABLE 3-continued

Beam-Working time-Working frequency domain comparison table

| Beam sequence number | Working time | Working frequency domain |
|---|---|---|
| 4 | T1 | F1 |
| 5 | T2 | F2 |
| 6 | T3 | F3 |
| 7 | T4 | F4 |

The UE may determine the resource information by looking up similar comparison tables such as Table 1 to Table 3 by using an obtained beam sequence number.

Manner 2: The UE determines the resource information through beam sweeping. For example, the UE records working time information of a beam by sweeping a beam that can be received and by determining whether the beam is received or a transmit power of the beam. Optionally, the UE extracts a MIB or a first system message from a swept beam, and records time information carried in the extracted MIB or first system message.

Manner 3: In a cell synchronization process, the UE determines the resource information based on beam information carried in a beam synchronization sequence.

In this manner, the network device adds the beam information to the synchronization sequence, so that the UE determines the resource information based on the beam information carried in the beam synchronization sequence in the cell synchronization process.

Optionally, the beam information carried in the beam synchronization sequence includes one or more of information about a total quantity of beams of a base station, information about parallel beams that occur simultaneously, and a signal used to identify a beam.

Optionally, the signal used to identify a beam includes one or more of a beam reference signal, a beam discovery signal, and a beam identifier. The beam discovery signal includes a beam reference signal in an implementation.

The beam information carried in the synchronization sequence in this manner has same content as that of the beam determining information in manner 1. For a manner of determining the resource information by using the beam information carried in the synchronization sequence, refer to manner 1.

A form of the beam information carried in the synchronization sequence may include a mask in addition to the form in manner 1, and the UE determines the resource information by traversing masks. The mask is a mask of the signal used to identify a beam or a mask corresponding to a resource used by a beam. Table 4 and Table 5 show tables of correspondences between a mask and a resource used by a beam. A resource used by a beam may be determined after a mask is obtained based on the relationship table.

TABLE 4

Table of a comparison between a mask and a resource used by a beam

| Beam resource | Mask $<x_{ant,0}, x_{ant,1}, \ldots, x_{ant,15}>$ |
|---|---|
| T1 | <0, 0, 0, 0, 0, 0, 0, 0, 0, 0, 0, 0, 0, 0, 0, 0> |
| T2 | <1, 1, 1, 1, 1, 1, 1, 1, 1, 1, 1, 1, 1, 1, 1, 1> |
| T3 | <0, 1, 0, 1, 0, 1, 0, 1, 0, 1, 0, 1, 0, 1, 0, 1> |
| ... | ... |
| Tn | <0, 1, 0, 1, 0, 1, 0, 0, 0, 1, 0, 1, 0, 0, 0, 1> |

TABLE 5

Table of a comparison between a mask and an index number of a signal used to identify a beam

| Index number of a signal used to identify a beam | Mask $<x_{ant,0}, x_{ant,1}, \ldots, x_{ant,15}>$ |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 3 | <0, 1, 0, 1, 0, 1, 0, 1, 0, 1, 0, 1, 0, 1, 0, 1> |
| ... | ... |
| n | <0, 1, 0, 1, 0, 1, 0, 0, 0, 1, 0, 1, 0, 0, 0, 1> |

The UE may first use pre-configured resource information or historical information of resource information. If the UE does not save related information, the UE may obtain the beam resource information in the foregoing manner, for example, recording the working time information of a beam by sweeping the beam that can be received.

In the foregoing step S102, a manner in which the UE receives the system information on the resource indicated by the resource information may include one or more of the following.

Manner 1: The base station sets or configures a system message sending resource according to a predefined manner. The UE obtains beam sending resource information and sending resource information of system information, and the UE may separately determine, based on the beam sending resource information and the sending resource information of system information, a beam sending resource and a sending resource of system information. Therefore, the UE may choose to receive the system information on an intersection resource of the resource indicated by the sending resource information of system information and the resource indicated by the beam sending resource information.

Manner 2: The base station configures, based on time domain resource information of a beam, sending resource information of system information on the beam, including time information. The UE obtains the beam sending resource information, and the UE may determine a beam sending resource based on the beam sending resource information, so that the UE may receive the system information on the resource indicated by the beam sending resource information.

That the UE receives system information on the resource indicated by the resource information may be that the UE receives, based on the beam sending resource information and according to a predefined rule or a manner notified by a network device, the system information on a subset or a full set of resources indicated by the beam sending resource information.

The first system information block in this application includes basic configuration information of a cell, including at least one type of the following information a public land mobile network (PLMN) identifier (ID), a track area code (TAC), a cell global identifier (CGI), carrier frequency information (carrierfreq), bandwidth information (bandwidth), information about whether a cell is barred (cellbarred), and cell access information.

A user terminal may establish a connection to a cell or camp on the cell based on access information. The cell access information may include at least one type of the following information a public land mobile network (PLMN) identifier (ID), a track area code (TAC), a cell global identifier (CGI), carrier frequency information, bandwidth information, random access information, operating mode information (TDD or FDD), cell logical channel configuration information, a cell physical channel and cell signaling configuration information, cell signaling configuration information, timer information, a cyclic prefix (cCP) length, and power control information.

The cell access information may include at least a part of information carried in a MIB, a SIB1, or/and a SIB2 specified in 3GPP 36.331 (3GPP TS 36.331 V13.0.0 (2015 December), download address: http://www.3gpp.org/dynareport/36331.htm), or a combination of at least parts of the information carried in the MIB, the SIB1, or/and the SIB2. Content of the protocol is included in this application, and details are not described again.

The second system information block includes information such as a measurement.

This application neither limits combining of the first system information block and the second system information block to form one system information block, nor limits splitting of the first system information block and/or the second system information block into a plurality of system information blocks.

A manner in which the UE receives the system information according to the predefined rule or the manner notified by the network device includes but is not limited to the following manners.

(1) The UE selects, in a specific sending period of system information, an available resource on a time domain resource of the beam to receive the first system information block and/or the second system information block. The base station configures sending times/a sending time of the first system information block and/or the second system information block based on the time domain resource of the beam.

(2) The UE selects, in a specific sending period of system information, a first available resource on a time domain resource of the beam to receive the first system information block and/or the second system information block.

The specific sending period of system information may be a sending period predefined by the UE or may be a sending period notified by the network device, or a sending period randomly selected by the UE may be used as the specific sending period of system information herein. In the specific sending period of system information, the UE selects the first available resource on the time domain resource of the beam to receive the first system information block and/or the second system information block.

(3) The UE may select, in a specific sending period of system information, an available resource closest to a predefined sending resource of system information on a time domain resource of the beam to receive the first system information block and/or the second system information block.

(4) The UE receives the first system information block and/or the second system information block based on a period and an offset that are notified by the network device or a period, an offset, and duration (or a transmit window length) that are notified by the network device.

(5) The UE receives the first system information block and/or the second system information block in a period that is a minimum common multiple of a sending period of system information and a period of a resource used by a beam.

(6) The UE selects, in a specific sending period of system information, a beam that includes sending resources/a sending resource of the first system information block and/or the second system information block on an available time domain resource to receive the first system information block and/or the second system information block. For example, a sending period of the first system information block is 40 ms, and the first system information block is sent in a fixed subframe 0, a working time of a beam 1 is in a subframe 0 of a period 1 (10 ms), a working time of a beam 2 is in a subframe 0 of a period 2 (10 ms), a working time of a beam 3 is in a subframe 0 of a period 3 (10 ms), a working time of a beam 4 is in a subframe 0 of a period 4 (10 ms). In this case, the UE receives the first system information block on the beam 1 in the subframe 0 in the period 1 (10 ms), receives the first system information block on the beam 2 in the subframe 0 in the period 2 (10 ms), receives the first system information block on the beam 3 in the subframe 0 in the period 3 (10 ms), and receives the first system information block on the beam 4 in the subframe 0 in the period 4 (10 ms).

In other words, if the UE may receive a plurality of beams, the UE reads system information of a beam N in each beam period based on resource information used by the beam N, where N is a sequence number of the plurality of beams received by the UE. To be specific, the UE reads, in one beam period, system information of the beam 1 on a sending resource of the beam 1, reads system information of the beam 2 on a sending resource of the beam 2 . . . , and reads the system information of the beam N on a sending resource of the beam N.

In another possible solution, that the UE receives, based on a predefined rule or a manner notified by a network device, the system information on the resource indicated by the resource information includes one or more of the following.

Manner 1: Sending periods and sending subframes/a sending period and a sending subframe of the first system information block and/or the second system information block are fixed, for example, the first system information block and the second system information block are still configured based on a configuration manner in an example, for example, a scheduling period of the MIB is 40 ms, and the MIB fixedly occupies a subframe 0 for sending, and a scheduling period of the SIB1 is 80 ms, and the SIB1 fixedly occupies a subframe 5 for sending. In this system information configuration manner, the UE may choose to read the first system information block and/or the second system information block on a beam that has an available resource at a sending time location of system information.

Manner 2: Sending periods and sending subframes/a sending period and a sending subframe of the first system information block and/or the second system information block are configured based on a beam sending period and a beam sending subframe. The UE selects a beam and reads the first system information block and/or the second system information block at a corresponding time location of the selected beam.

For example, if the base station configures an occurrence time of the beam 1 as RF1-subframe #0, RF2-subframe #1, RF3-subframe #2, and RF4-subframe #3, the base station chooses to send the MIB in a subframe or a time symbol that occurs on the beam 1. Correspondingly, the UE receives the MIB in the subframe in which the MIB occurs. Correspondingly, the base station further sends the SIB1 based on a subframe or a time symbol that occurs on the beam 1. Correspondingly, the UE receives the SIB1 at the time when the SIB1 occurs.

Figure 5:
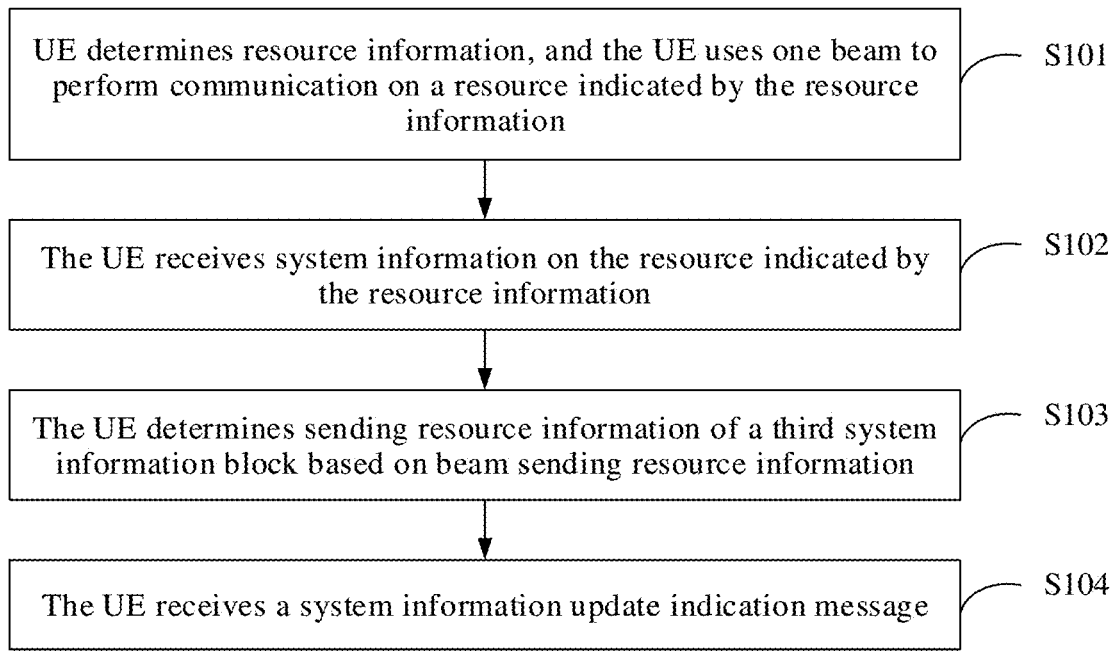
FIG. 5 is a flowchart of another method for receiving system information according to an embodiment of this application.

FIG. 5 is a flowchart of another method for receiving system information according to an embodiment of this application. In addition to step S101 and step S102 that are illustrated in the method for receiving system information shown in FIG. 3, FIG. 5 includes step S103, in which the UE determines sending resource information of a third system information block based on the resource information.

In a possible implementation, the UE determines a sending time of the third system information block by obtaining an intersection between a transmit window time of the third system information block and a beam sweeping time indicated by time domain information of a beam.

In another possible implementation, that the UE determines a sending resource of a third system information block through calculation includes the following.

The UE determines an intermediate value x according to a formula x=(n−1)*Window Length, where n is n in SI-n, SI is corresponding to the second system information block, n is a sequence number of the second system information block, n is greater than or equal to 1, and Window Length is an integer multiple of a beam sending period.

The UE determines a subframe location of SI-n according to a formula a=(x+u)mod 10, where a value of x+u is within a range of ((n−1)*Window Length, n*Window Length).

The UE determines a radio frame location of SI-n according to a formula SFN mod T1=Floor ((x+u)/10).

Further, u−x−beam_periodic*m=(beam_periodic/beam_num)*(beam_id−1).

T1 is a period si-Periodicity xn−1w of corresponding SI, w indicates si-WindowLength, and n is a sequence number subframe location scheduled for the SI in schedulingInfoList: x mod 10 starts from a start end of an SI-window and SI-RNTI is used to receive a DL-SCH continually until an end of the SI-window. The following subframes are not included: a subframe 5 in a radio frame, where SFN mod 20, any MBSFN subframe, or any uplink subframe in TDD.

In still another possible implementation, the UE determines an intermediate value x according to a formula x=(n−1)*Window Length, where n is n in SI-n, and n is greater than or equal to 1.

After determining x, the UE needs to determine locations of a radio frame and a subframe from which SI-n starts. A specific algorithm is as follows.

subframe location: a=x mod 10, and radio frame location, namely, frame number: SFN mod T2=Floor (x/10)

T2 is a minimum common multiple of a transmit window period and a beam sending period.

Window Length is an absolute value. The value range is [1, 2, 5, 10, 15, 20, 40], and a unit is a subframe and is indicated in the SIB1.

T1 is a period si-Periodicity xn−1w of corresponding SI, w indicates si-WindowLength, and n is a sequence number subframe location scheduled for the SI in schedulingInfoList: x mod 10 starts from a start end of an SI-window and SI-RNTI is used to receive a DL-SCH continually until an end of the SI-window. The following subframes are not included: a subframe 5 in a radio frame, where SFN mod 20, any MBSFN subframe, or any uplink subframe in TDD.

In this embodiment of this application, when the UE simultaneously receives a plurality of beams, the UE reads system information of a beam N in an $N^{th}$ beam period based on resource information used by the beam N, where N is a sequence number of the plurality of beams simultaneously received by the UE. To be specific, the UE reads system information of the beam 1 in a first beam period based on resource information used by the beam 1, the UE reads system information of the beam 2 in a second beam period based on resource information used by the beam 2 . . . , and the UE reads the system information of the beam N in the $N^{th}$ beam period based on the resource information used by the beam N.

In another possible manner, when the UE receives a plurality of beams, the UE selects, in a specific sending period of system information, a beam that includes a subset or all of transmit window sending resources of the third system information block on an available time domain resource to receive the third system information block. For example, a transmission period of the third system information block is 160 ms, a transmit window length is 5 ms, and the third system information block starts to be sent in a subframe 1 of a first radio frame in each period, a working time of a beam 1 is in the subframe 1 of the first radio frame in each period, a working time of a beam 2 is in a subframe 2 of the first radio frame in each period, a working time of a beam 3 is in a subframe 3 of the first radio frame in each period, a working time of a beam 4 is in a subframe 4 of the first radio frame in each period, a working time of a beam 5 is in a subframe 5 of the first radio frame in each period. In this case, the UE receives the third system information block on the beam 1 in the subframe 1 of the first radio frame in each period, receives the third system information block on the beam 2 in the subframe 2 of the first radio frame in each period, receives the third system information block on the beam 3 in the subframe 3 of the first radio frame in each period, receives the third system information block on the beam 4 in the subframe 4 of the first radio frame in each period, and receives the third system information block on the beam 5 in the subframe 5 of the first radio frame of each period.

The solution in this embodiment of this application may further include step S104: The UE receives a system information update indication message.

After receiving the system information indication message, the UE may obtain all or a part of the resource information again based on the system information update indication message.

In the step of receiving the system update indication message by the UE, a key is to determine a receiving time for receiving the system information update indication message. When determining the receiving time for receiving the system information update indication message, the UE needs to consider a beam sending time, to ensure that the receiving time for receiving the system information update indication message is aligned with the beam sending time.

A manner in which the UE ensures that the receiving time of the system information update indication message is aligned with the beam sending time includes but is not limited to the following manners.

Manner 1: After the UE determines a sending time location of the system information update indication message, the UE reads the system information update indication message on a beam that has an available resource at a corresponding time location.

For example, a paging message is used as an example. The UE may receive the paging message only in a specified subframe (PO) of a specified radio frame (PF), but information about a beam time needs to be added to calculation of the PF and the PO.

Based on an LTE paging mechanism, the UE can receive the paging message only in a fixed subframe (PO) of a specified radio frame (PF). For example, for a TDD system, the UE receives the paging message in a subframe in subframes 0, 1, 5, and 6 of a radio frame in a paging period, and after obtaining content of the paging message, the UE updates the system message or initiates a service. Specifically, a calculation method of the PF and the PO is as follows.

PF calculation formula: $SFN \bmod T = (T \operatorname{div} N) * (UE\_ID \bmod N)$ (1), and $i\_s$ index used to indicate a PO location: $i\_s = \operatorname{Floor}(UE\_ID/N) \bmod Ns$ (2).

Corresponding locations of the PO and i_s are as follows:

FDD: as shown in Table 6 (when Ns=1, i_s=Floor (UE_ID/N) mod Ns, where i_s is definitely 0):

TABLE 6

Table of a correspondence between a PO and i_s

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TDD: as shown in Table 7 (all UL/DL configurations):

TABLE 7

Table of a correspondence between a PO and i_s

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

Ns=max (1, nB/T), nB=4T, 2T, T, T/2, T/4, T/8, T/16, T/32, N: min (T, nB), T is a DRX period of the UE, and UE_ID is an identifier IMSI mode 1024 of the UE. nB and T may be sent to the UE by using a broadcast message.

After the UE determines a sending time location of the paging message according to the foregoing formulas (1) and (2), the UE chooses to read the paging message on a beam that has an available resource at a corresponding time point.

Manner 2: When a sending time of the system information update indication message is configured based on a beam sending period and a beam sending subframe, the UE reads the system information update indication message at a corresponding time location of a selected beam.

After determining the sending time location of the paging message according to the foregoing formulas (1) and (2), the UE reads the paging message on an intersection resource of the sending time of the paging message and a time used by the beam.

Manner 3: After determining a sending time location of the system information update indication message, the UE reads the system information update indication message on an intersection resource of an update indication message sending time and the beam sending time.

A paging message is still used as an example. A sending time location of the paging message is configured based on a beam sending period and a beam sending subframe, and the UE reads the paging message at a corresponding time point of a selected beam.

Manner 4: A period for receiving the system information update indication message by the UE is a minimum common multiple of a sending period of the system information update indication message and a beam sending period, and a subframe location for receiving the system information update indication message by the UE is configured based on a beam sending subframe location.

A paging message is still used as an example. A period for receiving the paging message by the UE is a minimum common multiple of a paging period calculated by using the foregoing formulas (1) and formula (2) and a beam sending period, and a paging subframe is configured based on a beam sending subframe.

For example, for a TDD system, the UE receives the paging message in a subframe in subframes 0, 1, 5, and 6 in a radio frame in a paging period, and after obtaining content of the paging message, the UE updates the system message. Specifically, a calculation method of the PF and the PO is as follows.

$PF$ calculation formula: $SFN \bmod T = (T \operatorname{div} N) * (UE\_ID \bmod N)$ (1)

$i\_s$ index used to indicate a PO location: $i\_s = \operatorname{Floor}(UE\_ID/N) \bmod Ns$ (2).

T1 is equal to a minimum common multiple (T, beam_periodic).

Corresponding positions of the PO and i_s are shown in Table 8.

TABLE 8

Table of a correspondence between a PO and i_s

| Ns | PO when i_s = 0 | PO when i_s = 1 | PO when i_s = 2 | PO when i_s = 3 |
|---|---|---|---|---|
| 1 | x | N/A | N/A | N/A |
| 2 | x | y | N/A | N/A |
| 4 | x | y | m | n |

Ns=max (1, nB/T), nB=4T, 2T, T, T/2, T/4, T/8, T/16, T/32, N: min (T, nB), T is a DRX period of the UE, and UE_ID is an identifier IMSI mode 1024 of the UE. nB and T may be sent to the UE by using a broadcast message. X, y, m, and n are any numbers in 0 to 9, and are selected within a beam transmission time.

The foregoing describes the solutions provided in the embodiments of this application mainly from a perspective of interaction between network elements. It can be understood that to achieve the foregoing functions, each network element, such as UE, a base station, or a core network entity, includes a corresponding hardware structure and/or software module for implementing each function. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 6:
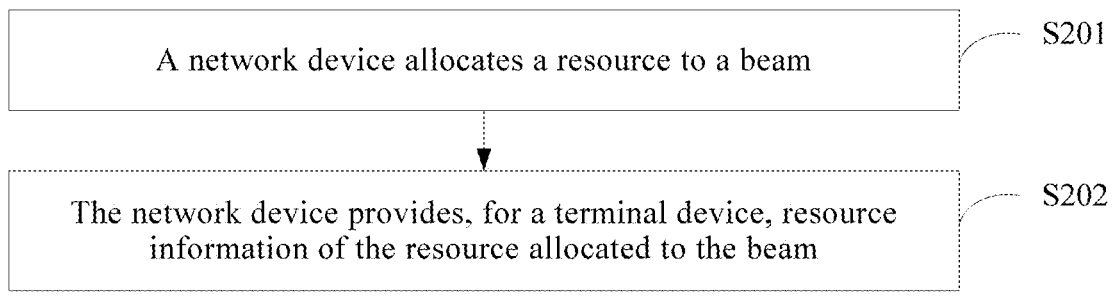
FIG. 6 is a flowchart of a method for sending system information according to an embodiment of this application.

FIG. 6 is a flowchart of a method for sending system information according to an embodiment of this application, and the method includes the following.

S201: A network device allocates a resource to a beam.

S202: The network device provides, for a terminal device, resource information of the resource allocated to the beam.

Optionally, the resource information includes one or more of frequency domain information, time domain information, code domain information, and space domain information.

Optionally, the frequency domain information includes one or more of frequency information, carrier information, radio resource block information, and subcarrier information.

Optionally, the time domain information is absolute time information, or the time domain information includes a period and an offset.

Optionally, the time domain information is at a granularity of a radio frame, a subframe, a time symbol, and/or a TTI.

Optionally, the network device provides beam determining information for the terminal device, so that the terminal device determines the resource information based on the beam determining information, where the beam determining information includes one or more of information about a total quantity of beams of a base station, information about parallel beams that occur simultaneously, and a signal used to identify a beam.

Optionally, the signal used to identify a beam includes one or more of a beam reference signal, a beam discovery signal, and a beam identifier.

Optionally, that the network device provides, for a terminal device, resource information of the resource allocated to the beam includes adding, by the network device, beam information to a synchronization sequence, so that the terminal device determines the resource information based on the beam information in the synchronization sequence, or providing, by the network device, a mask of a beam discovery signal or signaling for the terminal device, so that the terminal device determines the resource information by traversing masks.

Optionally, the resource information includes beam sending resource information and/or sending resource information of system information.

Optionally, the sending resource information of system information includes sending resource information of at least one first system information block and sending resource information of at least one second system information block.

Optionally, the method further includes notifying, by the network device, the terminal device of a receiving manner of system information, so that the terminal device receives, based on the notification of the network device, system information on a subset or a full set of resources indicated by the beam sending resource information.

Optionally, the notifying, by the network device, the terminal device of a receiving manner of system information includes selecting, in a specific sending period of system information, a first available resource on a time domain resource of the beam to receive the first system information block and/or the second system information block, or selecting, in a specific sending period of system information, an available resource closest to a predefined sending resource of system information on a time domain resource of the beam to receive the first system information block and/or the second system information block, or receiving the first system information block and/or the second system information block based on a period and an offset that are notified by the network device, or a receiving period of system information is a minimum common multiple of a sending period of system information and a period of a resource used by a beam.

Optionally, the notifying, by the network device, the terminal device of a receiving manner of system information includes, when sending periods and sending subframes/a sending period and a sending subframe of the first system information block and/or the second system information block are fixed, selecting a beam that has an available resource at a corresponding time point, and reading the first system information block and/or the second system information block on the beam; or when sending periods and sending subframes/a sending period and a sending subframe of the first system information block and/or the second system information block are configured based on a beam sending period and a beam sending subframe, selecting a beam, and reading the first system information block and/or the second system information block at a corresponding time point of the selected beam.

Optionally, the notifying, by the network device, the terminal device of a receiving manner of system information includes, when the terminal device simultaneously receives a plurality of beams, reading system information of a beam N in an $N^{th}$ beam period based on resource information used by the beam N, where N is a sequence number of the plurality of beams simultaneously received by the terminal device, or when the terminal device simultaneously receives a plurality of beams, reading system information of a beam N in each beam period based on resource information used by the beam N, where N is a sequence number of the plurality of beams simultaneously received by the terminal device.

Optionally, the method further includes: sending a system information update indication message to the terminal device.

Figure 7:
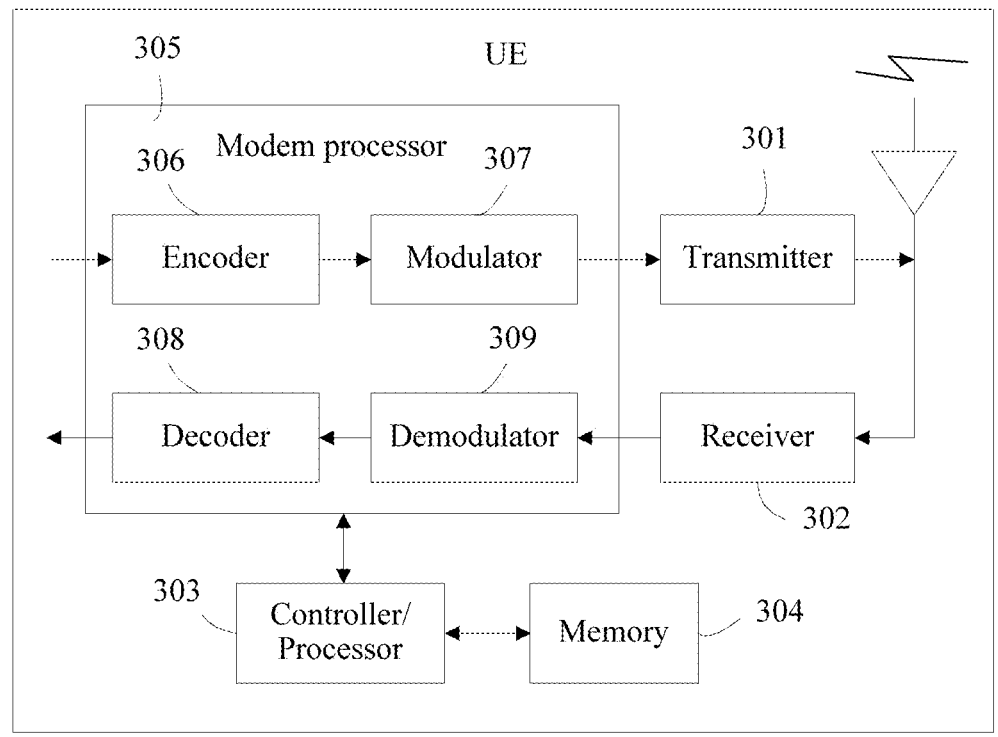
FIG. 7 is a simplified schematic diagram of a possible design structure of UE related to the foregoing embodiments.

FIG. 7 is a simplified schematic diagram of a possible design structure of UE related to the foregoing embodiments. The UE includes a transmitter 301, a receiver 302, a controller/processor 303, a memory 304, and a modem processor 305.

The transmitter 301 performs adjustment (such as analog-conversion, filtering, amplification, and up-conversion) on an output sample and generates an uplink signal. The uplink signal is transmitted to the base station in the foregoing embodiment by an antenna. In a downlink, the antenna receives a downlink signal transmitted by the base station in the foregoing embodiment. The receiver 302 performs adjustment (such as filtering, amplification, down-conversion, and digitization) on a signal received from an antenna and provides an input sample. In the modem processor 305, an encoder 306 receives service data and a signaling message that are to be sent in an uplink, and performs processing (such as formatting, coding, and interleaving) on the service data and the signaling message. A modulator 307 further performs processing (such as symbol mapping and modulation) on service data and a signaling message that are encoded and provides an output sample. A demodulator 309 performs processing (such as demodulation) on the input sample and provides a symbol estimate. A decoder 308 performs processing (such as de-interleaving and decoding) on the symbol estimate and provides the decoded data and signaling message to be sent to the UE. The encoder 306, the modulator 307, the demodulator 309, and the decoder 308 may be implemented by the integrated modem processor 305. These units perform processing based on a radio access technology (such as an access technology in an LTE or another evolved system) used by a radio access network.

The controller/processor 303 controls and manages an action of the UE, and is configured to perform processing performed by the UE in the foregoing embodiment, for example, is configured to control the UE to determine the resource information and/or is configured to control another process of the technology described in this application. As an example, the controller/processor 303 is configured to support the UE in executing the process 101 in FIG. 3 and the processes 101 and 103 in FIG. 5.

Figure 8:
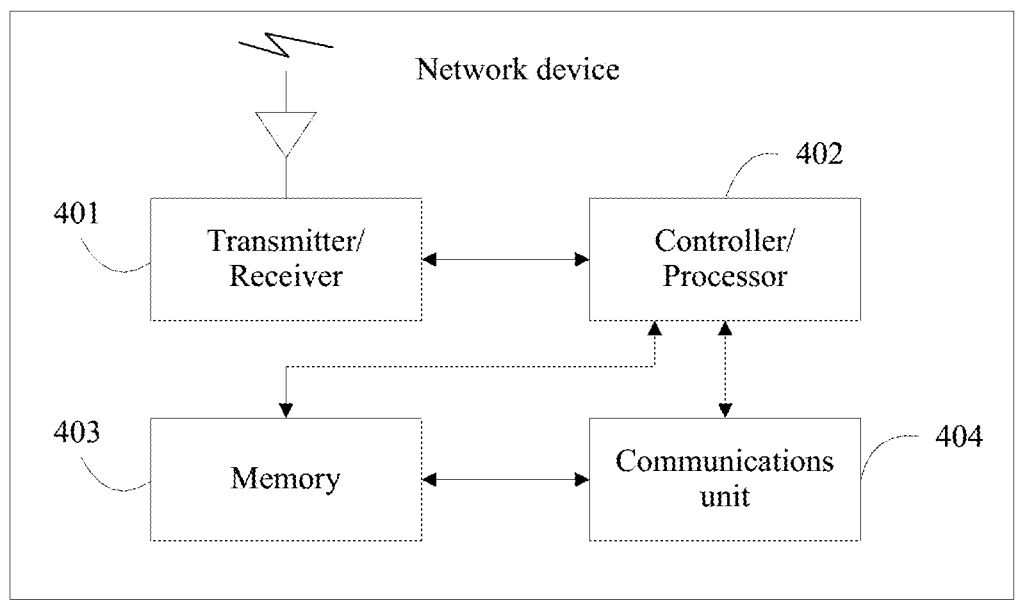
FIG. 8 is a possible schematic structural diagram of a network device related to the foregoing embodiments.

FIG. 8 is a possible schematic structural diagram of a network device related to the foregoing embodiments. As shown in FIG. 8, the network device includes a transmitter/receiver 401, a controller/processor 402, a memory 403, and a communications unit 404. The transmitter/receiver 401 is configured to support the network device in receiving/transmitting information from/to the UE in the foregoing embodiment, and support the UE in performing radio communication with other UE. The controller/processor 402 performs various functions used for communicating with the UE. In an uplink, an uplink signal from the UE is received by an antenna, demodulated by the receiver 401, and further processed by the controller/processor 402, so as to restore service data and signaling information that are sent by the UE. In a downlink, service data and a signaling message are processed by the controller/processor 402, and demodulated by the transmitter 401 to generate a downlink signal, and the downlink signal is transmitted by an antenna to the UE. The controller/processor 402 further performs a processing process related to the network device in FIG. 6 and/or is configured to perform another process of the technology described in this application. The memory 403 is configured to store program code and data of the network device. The communications unit 404 is configured to support the network device in communicating with another network entity. For example, the communications unit 404 is configured to support the network device in communicating with another communications network entity shown in FIG. 2, such as an MME, an SGW, and/or a PGW in a core network EPC.

It may be understood that FIG. 8 shows merely a simplified design of the network device. In actual application, the network device may include any quantities of transmitters, receivers, processors, controllers, memories, communications units, and the like, and all network devices that can implement this application fall within the protection scope of this application.

The controller/processor configured to perform functions of the foregoing network device and the UE in this application may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute example logical blocks, modules, and circuits described with reference to content disclosed in this application. Alternatively, the processor may be a combination implementing a computing function, for example, a combination of one or more microprocessors, or a combination of the DSP and a microprocessor.

Method or algorithm steps described with reference to the content disclosed in this application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer. The objectives, technical solutions, and beneficial effects of this application are further described in detail in the foregoing specific embodiments. It should be understood that the foregoing descriptions are merely specific embodiments of this application, but are not intended to limit the protection scope of this application. Any modification, equivalent replacement or improvement made within the spirit and principle of this application shall fall within the protection scope of this application.

What is claimed is:

1. A method, comprising:
obtaining, by a terminal device, beam determining information, wherein the beam determining information comprises a beam reference signal;
determining, by the terminal device, resource information based on the beam determining information, wherein the resource information indicates a resource for receiving system information, and wherein determining the resource information based on the beam determining information comprises determining, by the terminal device, the resource information based on a correspondence between the signal usable for identifying the beam and the resource information; and
receiving, by the terminal device, the system information on the resource indicated by the resource information, wherein the terminal device uses one beam to receive the system information on the resource.

2. The method according to claim 1, wherein obtaining, by the terminal device, the beam determining information comprises:
obtaining, by the terminal device, the beam determining information from a network device.

3. The method according to claim 1, wherein the beam determining information further comprises
a beam identifier corresponding to the beam.

4. The method according to claim 1, wherein determining, by the terminal device, the resource information comprises:
sweeping a beam by the terminal device; and
extracting a master information block (MIB), by the terminal device, from the beam, wherein time information is carried in the MIB.

5. The method according to claim 1, wherein the system information comprises at least one of a system information block (SIB), or a master information block (MIB).

6. The method according to claim 1, wherein the resource information includes at least one of frequency domain information, time domain information, code domain information, or space domain information.

7. The method according to claim 6, wherein, the resource information includes the time domain information, and wherein at least one of:

the time domain information is absolute time information;

the time domain information includes a period and an offset;

the time domain information includes a period, an offset, and duration; or the time domain information is at a granularity of at least one of a radio frame, a subframe, a time symbol, or a transmission time interval (TTI).

8. A method, comprising:

allocating, by a network device, a resource to a beam, wherein the resource is used to send system information;

sending, by the network device to a terminal device, beam determining information, wherein the beam determining information comprises a beam reference signal, wherein the beam determining information is used to determine resource information, wherein the resource information indicates the resource, and wherein determining the resource information comprises determining the resource information based on a correspondence between the signal usable for identifying the beam and the resource information; and sending, by the network device, system information to the terminal device on the resource indicated by the resource information.

9. The method according to claim 8, wherein the beam determining information further comprises a beam identifier corresponding to the beam.

10. The method according to claim 8, wherein the system information comprises at least one of a system information block (SIB), or a master information block (MIB).

11. The method according to claim 8, wherein the resource information includes at least one of frequency domain information, time domain information, code domain information, or space domain information.

12. The method according to claim 11, wherein, the resource information includes the time domain information, and wherein at least one of:

the time domain information is absolute time information;

the time domain information includes a period and an offset;

the time domain information includes a period, an offset, and duration; or the time domain information is at a granularity of at least one of a radio frame, a subframe, a time symbol, or a transmission time interval (TTI).

13. A terminal device, comprising:

a receiver;

a processor; and a non-transitory computer-readable storage medium storing a program to be executed by the processor, the program including instructions to:

obtain beam determining information, wherein the beam determining information comprises a beam reference signal;

determine resource information based on the beam determining information, wherein the resource information indicates a resource for receiving system information, and wherein determining the resource information based on the beam determining information comprises determining the resource information based on a correspondence between the signal usable for identifying the beam and the resource information; and receive, using the receiver, the system information on the resource indicated by the resource information, wherein the terminal device uses one beam to receive the system information on the resource.

14. The terminal device according to claim 13, wherein the instructions to obtain the beam determining information include instructions to obtain the beam determining information from a network device using the receiver.

15. The terminal device according to claim 13, wherein the beam determining information further comprises a beam identifier corresponding to the beam.

16. The terminal device according to claim 13, wherein the instructions to determine the resource information include instructions to sweep a beam and extract a master information block (MIB) from the beam, wherein time information is carried in the MIB.

17. A network device, comprising:

a transmitter;

a processor; and a non-transitory computer-readable storage medium storing a program to be executed by the processor, the program including instructions to:

allocate a resource to a beam, wherein the resource is used to send system information;

send, to a terminal device, beam determining information, wherein the beam determining information comprises a beam reference signal, wherein the beam determining information is used to determine resource information, wherein the resource information indicates the resource, and wherein determining the resource information comprises determining the resource information based on a correspondence between the signal usable for identifying the beam and the resource information; and cause the transmitter to send system information to the terminal device on the resource indicated by the resource information.

* * * * *